(12) United States Patent
Fukuda

(10) Patent No.: US 6,523,627 B2
(45) Date of Patent: *Feb. 25, 2003

(54) COOLING ARRANGEMENT FOR ALL TERRAIN VEHICLE

(75) Inventor: Kazutaka Fukuda, Iwata (JP)

(73) Assignee: Yamaha Hatsudoki Kabushiki Kaisha (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/290,808

(22) Filed: Apr. 13, 1999

(65) Prior Publication Data

US 2002/0043412 A1 Apr. 18, 2002

(30) Foreign Application Priority Data

Apr. 13, 1998 (JP) .............................. 10-101143

(51) Int. Cl.⁷ .............................. B60K 11/04; F01P 5/10; F02B 77/00
(52) U.S. Cl. ................ 180/68.4; 123/41.44; 123/41.47; 123/198 C
(58) Field of Search ................. 180/68.4, 68.6, 180/378; 123/41.44, 41.47, 198 C

(56) References Cited

U.S. PATENT DOCUMENTS

| | | | | |
|---|---|---|---|---|
| 4,666,015 A | * | 5/1987 | Matsuda et al. ............ 180/233 |
| 4,736,809 A | * | 4/1988 | Kumazawa ................ 180/75.1 |
| 5,113,807 A | | 5/1992 | Kobayashi | |
| 5,191,859 A | * | 3/1993 | Fujiwara ................. 123/41.44 |
| 5,515,940 A | * | 5/1996 | Shichinohe et al. ........ 180/376 |
| 5,715,784 A | | 2/1998 | Okui et al. | |
| 5,724,930 A | | 3/1998 | Sakurai et al. | |
| 5,732,667 A | | 3/1998 | Sakurai | |
| 6,109,221 A | * | 8/2000 | Higgins et al. .......... 123/41.44 |
| 6,170,597 B1 | * | 1/2001 | Fukuda ....................... 180/292 |
| 6,196,166 B1 | * | 3/2001 | Yonezawa ................ 123/41.01 |
| 6,202,621 B1 | * | 3/2001 | Inumaru et al. ............ 123/196 |
| 6,205,971 B1 | * | 3/2001 | Inumaru et al. ............ 123/196 |
| 6,314,934 B1 | * | 11/2001 | Ito et al. ................. 123/196 R |

FOREIGN PATENT DOCUMENTS

JP          4-112924          4/1992

* cited by examiner

Primary Examiner—Brian L. Johnson
Assistant Examiner—Jeffrey J. Restifo
(74) Attorney, Agent, or Firm—Knobbe, Martens, Olson & Bear, LLP

(57) ABSTRACT

An all terrain vehicle has a cooling pump that is driven off a balancer shaft. The balancer shaft, in turn, is driven off a crankshaft. The cooling pump is preferably recessed inside of an outer surface of a crankcase cover member. Additionally, a lubricant pump is also driven off the balancer shaft and arranged inwardly from the cooling pump. The cooling pump is arranged to one side of the all terrain vehicle while a variable speed transmission is arranged to the other side of the all terrain vehicle.

29 Claims, 4 Drawing Sheets

COOLING ARRANGEMENT FOR ALL TERRAIN VEHICLE

BACKGROUND OF THE INVENTION

1. Field of the Invention

The present invention generally relates to a cooling arrangement for all terrain vehicles. More particularly, the present invention relates to an engine cooling arrangement for use in all terrain vehicles.

2. Related Art

All terrain vehicles are often operated in open terrain under difficult running conditions. While such vehicles often may have unrestricted size, it is desirable to decrease the size and weight of the vehicle. For instance, a smaller vehicle allows its operator to maneuver into locations previously unreachable by the larger vehicles. Moreover, decreasing the size and weight of the vehicle increases the power to weight ratio of the vehicle as well as increases the fuel economy of the vehicle.

In the past, in some all terrain vehicles, the cooling systems have employed a cooling pump that is positioned under a forward portion of the crankcase. The cooling pump is used to circulate coolant between a radiator and an engine. The cooling pump was, in such applications, driven by connecting an input shaft to a crankshaft. The connection of the input shaft to the crankshaft might include a reduction gear train.

With the introduction of variable belt drive transmissions to all terrain vehicles, the transmission was positioned to a side of the engine and extended between the crankshaft and the engine output shaft. Because of the positioning of the transmission components, the crankcase had to be enlarged to accommodate both the transmission components and the cooling pump input shaft and its drive. Therefore, it became difficult to reduce the size of the crankcase while employing both a cooling pump and a variable speed transmission.

Moreover, due to the environments in which all terrain vehicles are used, the water pump had to be located in a protected location. Accordingly, the pump had to be positioned in locations that would not subject the water pump to abuse by environmental elements. For instance, the water pump would be positioned low within the crankcase to reduce the likelihood of inadvertent contact with passing elements. This position, however, led to maintenance difficulties.

SUMMARY OF THE INVENTION

There, thus, was a need for a water pump positioned for protection yet easily accessible for service and maintenance. Additionally, the water pump was preferably positioned so as to take advantage of the existing drive components of the engine while not interfering with the operation of the components. Moreover, the water pump was preferably positioned so as to allow the crankcase's overall lateral footprint to be reduced.

Accordingly, one aspect of the present invention involves an all terrain vehicle comprising a frame, a seat mounted to an upper portion of the frame, at least one front wheel and at least one rear wheel connected to the frame. An engine transmission assembly and an engine are preferably mounted within the frame. The engine has a cylinder block, a cylinder head assembly attached to the cylinder block and a crankcase cover attached to the cylinder block generally opposite the cylinder head assembly. The transmission assembly contains, in part, transmission for driving the vehicle. A cooling pump is preferably attached to a side of the engine transmission assembly. A crankshaft is mounted for rotation within a crankcase generally defined by the cylinder block and the crankcase cover. Moreover, the engine transmission assembly preferably includes a balancer shaft driven off the crankshaft, and a cooling pump drive driven off the balancer shaft wherein the cooling pump drive has a rotational speed slower than a rotational speed of the balancer shaft.

Another aspect of the present invention involves an all terrain vehicle comprising a frame and an engine mounted to the frame. The engine generally comprises a cylinder block including a piston mounted for reciprocation within the cylinder block. A connecting rod is connected to the piston. The engine also comprises a crankshaft having at least one throw with the throw of the crankshaft being connected to the connecting rod. The crankshaft is preferably positioned within a crankcase with one end of the crankshaft carrying a flywheel magneto. The other end of the crankshaft is preferably connected to a clutch. A cooling pump is preferably positioned rearward of the crankshaft and connected to the crankshaft through a gear train.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which drawings.

DETAILED DESCRIPTION OF THE PREFERRED EMBODIMENT OF THE INVENTION

Figure 1:
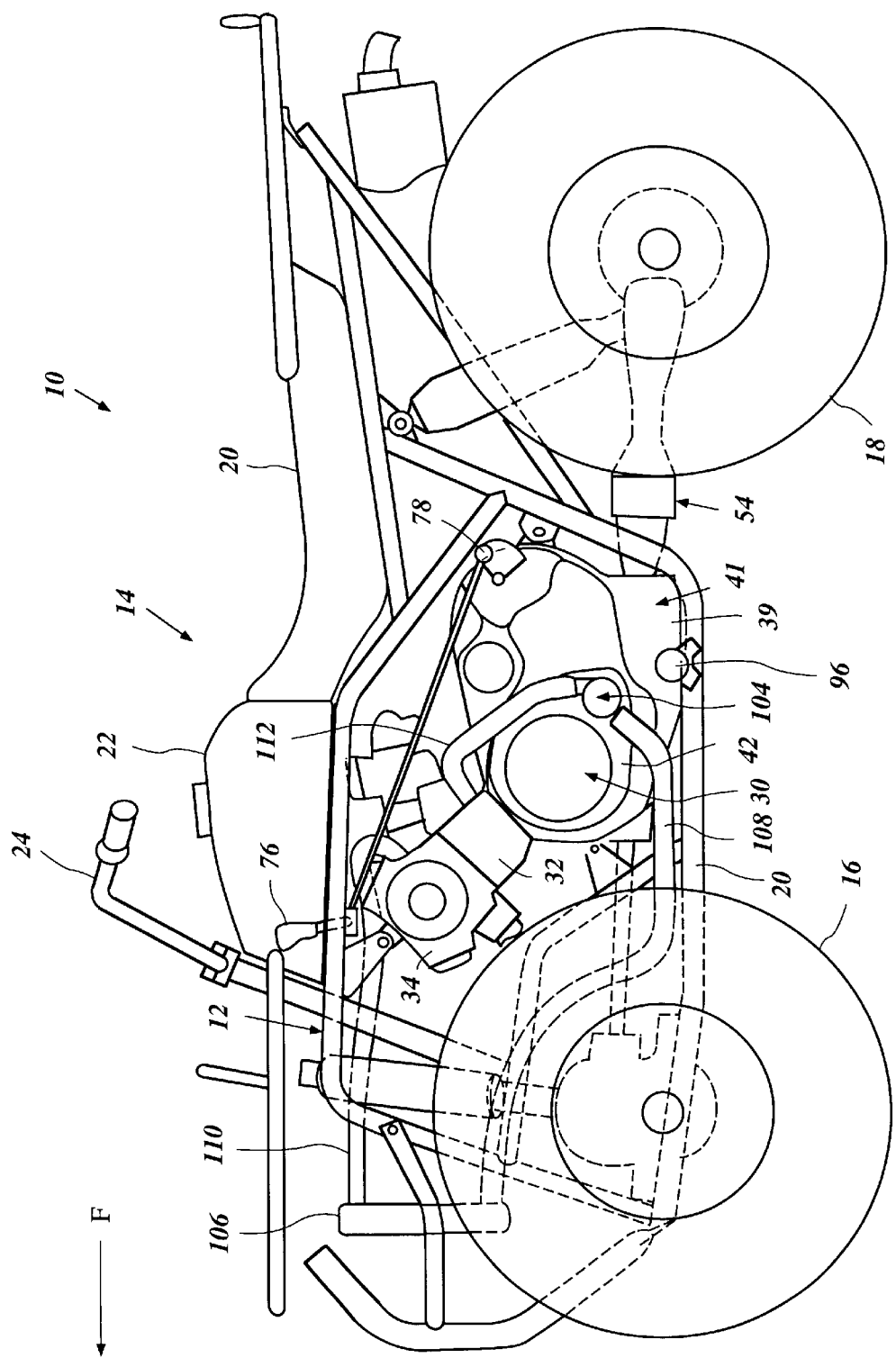
FIG. 1 is a side view of an all terrain vehicle having an engine cooling system arranged and configured in accordance with certain features, aspects and advantages of the present invention and having some internal components illustrated with hidden lines.

With reference initially to FIG. 1, an all terrain vehicle configured and arranged in accordance with certain features, aspects and advantages of the present invention will be described in detail. The illustrated vehicle, indicated generally by the reference numeral 10, provides an exemplary environment in which the present cooling system will be described. While the vehicle 10 is a small stature, four wheel, all terrain vehicle, one of ordinary skill in the art will readily recognize that the present cooling system may find utility in a variety of other land-based vehicles as well.

With continued reference to FIG. 1, the vehicle 10 is generally comprised of a frame 12, a body 14, a pair of front wheels 16 and a pair of rear wheels 18 assembled together in any suitable manner. The frame 12 is typically of a welded construction and generally defines, in part, a centrally located engine compartment.

The illustrated frame also carries several components that, together, form the body 14. For instance, a seat 20 is carried atop a rear portion of the frame 12. A fuel tank 22 is typically secured to the frame 12 forward of the seat 20. Moreover, a steering handle assembly 24 is connected to the front wheels 16 in any suitable manner and extends upward through the frame 12 to a location generally above a forward portion of the fuel tank 22. As will be recognized, gauges, which may transmit information relating to operating conditions of the vehicle 10, may be arranged proximate the steering handle assembly 24. As each of these components and the methods related to their manufacture and assembly are considered to be well known to those of ordinary skill in the art, further description is deemed unnecessary.

An internal combustion engine 30 is mounted to the frame 12 within the engine compartment in any suitable manner. In the illustrated embodiment, the engine 30 comprises a one-cylinder, two-cycle construction. It should be appreciated that the engine 30 could also have two or more cylinders and could operate on any known operating principle, such as a four-cycle principle.

The engine 30 generally comprises a cylinder block 32. The cylinder block 32 preferably contains at least one cylinder bore (not shown) which may be inclined along an axis that is skewed relative to a vertically extending axis. Such a configuration allows for a reduced vertical dimension to the overall engine envelope and, therefore, creates a more compact engine arrangement and a reduced vehicle size and weight. A cylinder head assembly 34 may be attached to the cylinder block 32 covering an end of the cylinder bore. The cylinder head assembly 34 preferably features a recess which cooperates with the cylinder bore and a top surface of a piston (not shown) to define a combustion chamber within the cylinder.

Figure 2:
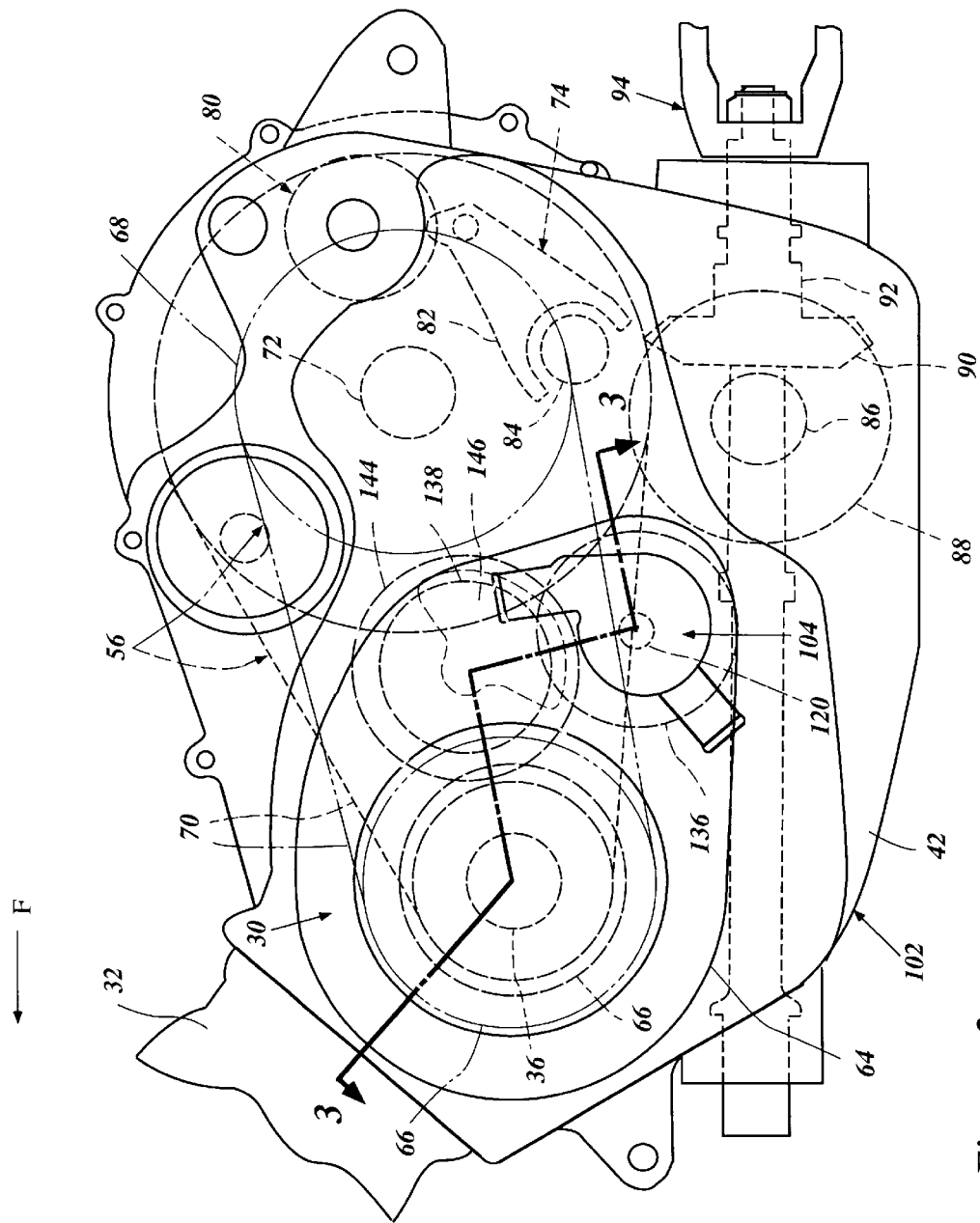
FIG. 2 is an enlarged side view of a portion of a crankcase and a transfer case arranged and configured in accordance with certain features, aspects and advantages of the present invention with some internal components illustrated with hidden lines.
Figure 3:
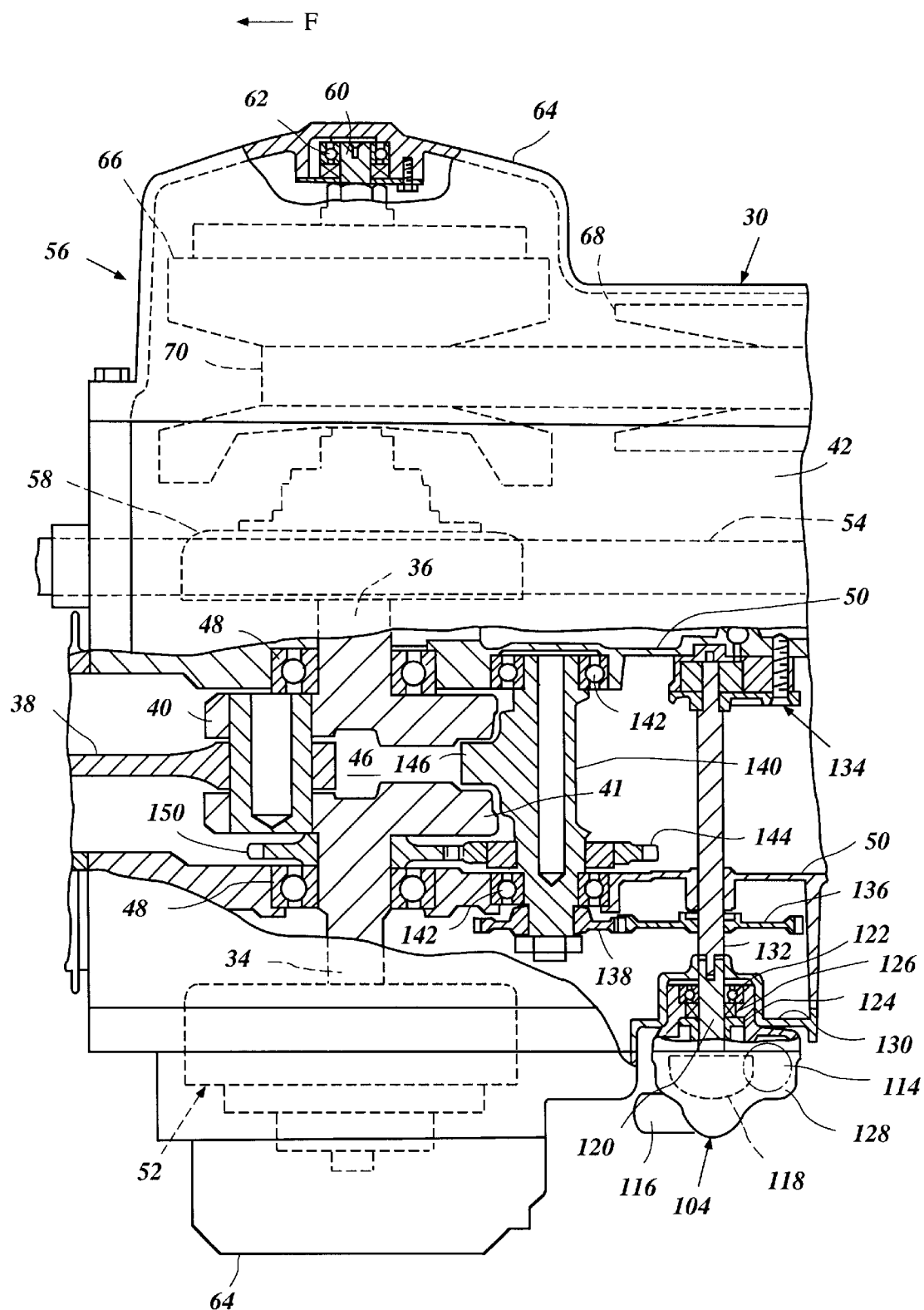
FIG. 3 is partially sectioned view of the crankcase and the transfer case of FIG. 2 taken along the line 3—3 with some internal components illustrated with hidden lines; and, FIG. 4 is a schematic illustration of a cooling system arranged and configured in accordance with certain features, aspects and advantages of the present invention.

With reference to FIG. 2, the piston (not shown) reciprocates within the cylinder bore (not shown) and is connected to a crankshaft 36 via a connecting rod 38 (see FIG. 3). With reference to FIG. 3, the connecting rod 38 is preferably connected to a throw 40 of the crankshaft 36 such that, as the piston (not shown) completes a full translating cycle, the crankshaft 36 may complete a full revolution. A counterweight portion 41 of the crankshaft 36 preferably extends from the opposing side of the crankshaft 36 relative to the throw 40. The linkage between the piston (not shown) and the crankshaft 36, therefore, transposes the piston's reciprocal translating motion into a rotational output while the counterweight portion helps to balance the rotation of the crankshaft 36.

The crankshaft 36, as illustrated in FIG. 3, is substantially restrained for rotational movement within a crankcase 42. The crankcase 42 generally defines a crank chamber 46. In the illustrated embodiment, a set of bearings 48 journal the crankshaft 36 for rotation within the crank chamber 36. The bearings 48 are set within a substantially vertically extending wall 50 which defines a single cell of the crank chamber 36 that corresponds to the cylinder. In multiple cylinder embodiments, a plurality of such walls would segregate the crank chamber 36 into several cells such that one cell would correspond to one cylinder.

A flywheel magneto 52 is connected to one end of the illustrated crankshaft 36. As is known, the flywheel magneto rotates with the crankshaft and may be used for to sense the engine speed. Additionally, the flywheel magneto may function as an electrical generator in some embodiments. As the flywheel magneto 52 is relatively unimportant to the present cooling system arrangement, further description of the flywheel magneto 52 is deemed unnecessary.

With continued reference to FIG. 3, the rotational power of the illustrated crankshaft 36 is transferred to at least one drive line 54 (see FIG. 1) through a variable speed belt-drive transmission 56. In the illustrated embodiment, the drive line 54 is preferably a shaft drive; however, as will be recognized by those of ordinary skill in the art, the drive line 54 may also comprise chain drives, geared drives or any other suitable drive arrangement. As illustrated in FIG. 3, the driveline 54 extends substantially normal to the crankshaft 36. Accordingly, a transfer gearing arrangement, discussed below, is provided within a transfer case to transfer the power from a laterally extending crankshaft 36 to the longitudinally extending drive line 54.

In the illustrated embodiment, a centrifugal clutch 58 connects the crankshaft 36 and a transmission input shaft 60. The centrifugal clutch 58, as is well known, automatically disengages the input shaft 60 from the crankshaft 36 when the engine speed falls below a predetermined speed and re-engages the two shafts 36, 60 when the engine speed exceeds the predetermined speed. The input shaft 60, as illustrated, is preferably journaled for rotation by a set of bearings 62, including the bearings 62 that are carried in a crankcase cover 64.

A drive v-belt pulley 66 is preferably connected to the input shaft 60 with splines such that the drive pulley 66 is coupled for rotation with the input shaft 60. As is known, the drive pulley is designed to expand or contract due to increases and decreases in engine speed, thereby altering the drive ratio as the engine speed changes. A driven pulley 68 is coupled to the drive pulley 66 with a drive belt 70. The driven pulley may also be configured to change in effective diameter, either with rotational speed or to counteract some of the drive pulley's expansion through spring-biased relief. FIG. 2 illustrates, in phantom lines, a high speed positioning of the drive pulleys 66, 68 and the drive belt 70 and, in hidden lines, a low speed configuration.

With reference now to FIG. 2, the driven pulley 68 is coupled to an output shaft 72. The output shaft 72 is preferably engaged with a shiftable transmission 74 such that a high-speed range and a low-speed range can be selectively engaged. With reference to FIG. 1, a shift controller 76 is preferably positioned within easy reach of an operator. In one embodiment, the shift controller 76 may be positioned in a protected region of the vehicle body to one side of the operator. In the illustrated embodiment, the shift controller 76 may be positioned proximate the fuel tank 22 and the steering arrangement 24.

In the illustrated embodiment, the shift controller 76 is connected to a shiftable gearing arrangement within the transfer case via a shift linkage 78. As the shift linkage 78 is pivoted, a shifting drum 80 is rotated. As the shifting drum 80 is rotated, a follower arm of a shifting fork arrangement 82 is moved laterally. Specifically, the shifting drum 80 includes a helical groove in some embodiments. The follower arm is engaged with the helical groove such that as the shifting drum 80 rotates about its axis, the follower arm, and the balance of the shifting fork arrangement, translates along the path substantially parallel to the axis. The shifting fork arrangement then selectively engages or disengages a gearing arrangement carried on a secondary drive shaft 84 to control whether the vehicle is in a high-speed or low-speed gearing arrangement.

In the illustrated embodiment, the gearing arrangement on the secondary drive shaft 84 transfers the rotational power to a third drive shaft 86 carried within the transfer case. An input bevel gear 88 is splined to the third drive shaft 86 and engages with an output bevel gear 90. The output bevel gear, as illustrated, is splined to an output shaft 92 that may drive the rear wheels, the front wheels, or both selectively or constantly. As also illustrated, the output shaft 92 carries at least one universal joint 94 to allow the output shaft to be coupled to the drive line 54.

Figure 4:
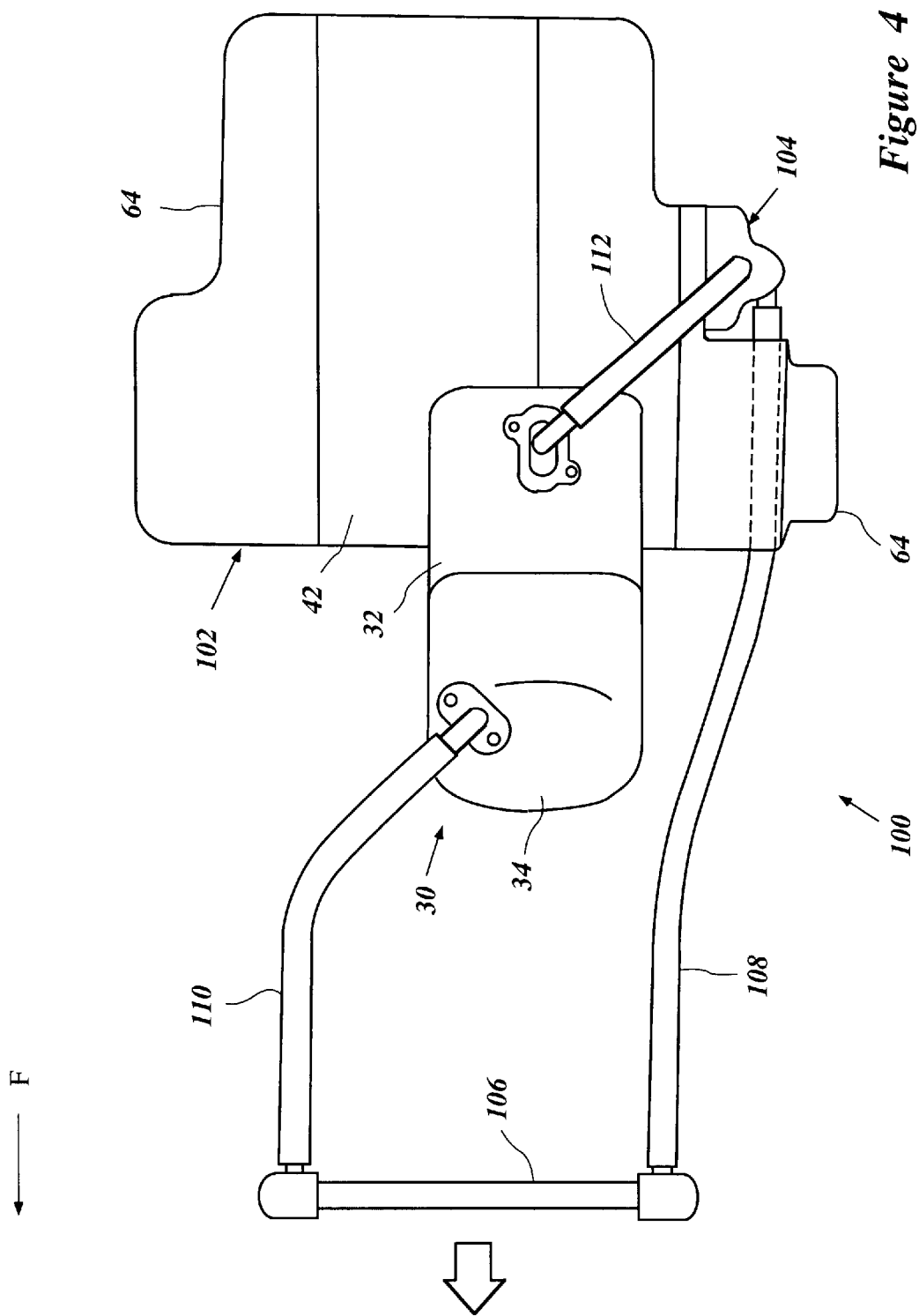

With reference now to FIGS. 1 and 4, the illustrated vehicle 10 also carries an engine cooling system 100 which is designed to cool at least a portion of a drive unit 102 of the vehicle. The cooling system 100 generally comprises a coolant pump unit 104 and a radiator unit 106 that are connected via tubing and passageways extending through the drive unit 102. With reference to FIG. 4, in the illustrated embodiment, a first transfer line 108 extends between the pump unit 104 and the radiator 106 and carries heated coolant from the pump unit 104 to the radiator 106. The heated coolant then passes through the finned structure of the radiator 106 and is cooled by heat transfer that occurs within the radiator 106. The coolant is then cycled to cooling passages of the engine and transmission (not shown) through a return transfer line 110 that is connected to the cylinder head assembly 34 in the illustrated embodiment. The coolant flows through the cylinder head assembly and the cylinder block 32 in any suitable manner and is returned to the coolant pump 104 through a pump supply line 112. The transfer and supply lines 108, 110, 112 may be connected to the radiator 106, the pump 104 and the engine 30 in any suitable manner. For instance, standard pipe clamps may be used to clamp the lines to male extensions from the respective cooling system components.

With reference now to FIGS. 2 and 3, a pump drive mechanism will be described in detail. As illustrated, the coolant pump 104 is desirably positioned between the crankshaft 36 and the driven shaft 72 of the transmission 56. In this position, the coolant pump drive mechanism does not interfere with the transmission and the pump 104 and its drive mechanism may be tucked within the crankcase 42 or transfer case without extending substantially outward from the side of the vehicle 10. This configuration, therefore, enables the lateral dimension of the drive unit 102 to be decreased over other constructions. For instance, as illustrated in FIG. 4, the coolant pump 104 is positioned so that its outermost portion does not extend as far outward as an outermost portion of the crankcase cover 64. In this position, the coolant pump 104 is also substantially protected from physical contact with brush and debris commonly encountered when operating an all terrain vehicle. Moreover, the coolant pump 104 is advantageously positioned to decrease its impedance into a foot or leg area of the operator or rider. For instance, as illustrated in FIG. 1, a foot peg 96 is positioned slightly rearward of the coolant pump along a longitudinal axis. Accordingly, the bent leg of an operator is likely to extend forward to at least the location of the coolant pump 104 and, if the coolant pump 104 protruded outward to a sufficient degree, the coolant pump 104 may interfere with a comfortable riding position for a rider on a compact vehicle 10.

With reference to FIG. 3, the coolant pump 104 is preferably a gear pump and includes an inlet 114 and an outlet 116. An impeller 118 is positioned within the pump 104 and is preferably interposed between the inlet 114 and the outlet 116. As illustrated, the pump inlet 114 extends downward into the body of the pump 104 and the pump outlet 116 also extends downward away from the body of the pump 104. As is known, as the impeller 18 is rotated, coolant is forced from the inlet 114 to the outlet 116 and a coolant flow is established.

The impeller 118 is positioned at one end of an impeller drive shaft 120, as illustrated in FIG. 3. The impeller drive shaft 120 extends substantially laterally within the crankcase 42 and substantially parallel to the crankshaft 36. As illustrated, a set of ball bearings 122 journal the impeller shaft 120 for rotation. The bearings 122 are positioned proximate the impeller 118 and the opposing end of the shaft 120 in one embodiment. In the illustrated embodiment, the impeller shaft 120 extends through a bushing 124 and a seal 126 prior to extending through the bearing 122. The bushing, bearing and seal are positioned within a pump housing 128. The pump housing 128 is preferably designed to fit within a recess 130 of the crankcase cover 64 such that the lateral protrusion of the pump housing 128 may be decreased.

The impeller shaft 120 is coupled to a transfer shaft 132 in any suitable manner. As illustrated, the transfer shaft 132 also drives an oil pump 134. A gear 136 is splined to the transfer shaft 132 such that rotation of the gear 136 can be transferred to the transfer shaft 132 and, ultimately, to the oil pump 134 and the impeller shaft 120.

The transfer gear 136 engages with a second gear 138 that is coupled to a balancer shaft 140. As illustrated, the transfer gear 136 is desirably of a larger diameter than the second gear 138. In this manner, the rotational speed of the balancer shaft 140 can be reduced to a lower speed for the coolant pump 104 and the oil pump 134.

A set of ball bearings 142 journal the illustrated balancer shaft 140 for rotation within the crankcase 42. The bearings 142 in the illustrated embodiment are positioned at one end of the shaft 140 and are interposed between the second gear 138 and a third gear 144 at the other end of the shaft 140. Interposed between the third gear 144 and the first end of the shaft 140 is an asymmetrically increased cross-sectional portion, or balancer portion, 146 of the shaft that acts to counterbalance the motion of the piston and crankshaft 36. In this manner, the motion of the single cylinder can be countered by the rotation of the balancer shaft 140. While it is possible to increase the opposing side of the crankshaft 36 to counter the motion of the piston, utilizing the balancer shaft 140 in the illustrated embodiment allows the crankshaft 36 to have a smaller effective diameter. Moreover, utilizing the balancer shaft 140 to power the coolant pump 104 leads to a synergistic reduction in engine size. Note that the balancer portion 146 is sized and configured to pass through the increased diameter, or webbing 41, of the illustrated crankshaft 36.

The third gear 144 engages with, and is constantly driven by a driving gear 150, which is splined to the crankshaft 36 in the illustrated embodiment. The third gear 144 and the driving gear 150 are preferably of substantially the same size and configuration to allow the balancer shaft 140 to rotate at substantially the same speed as the crankshaft 36.

Accordingly, the crankshaft 36 is rotatably driven by the pistons of the engine 30 in a known manner. The crankshaft 36 powers the balancer shaft 140 through a gear train. Preferably, the rotational speed of the crankshaft 36 and the balancer shaft 140 are approximately the same. The balancer shaft, in turn, powers the transfer shaft 132 through a second gear train. Preferably, the second gear train steps down the rotational speed from the balancer shaft 140 to the transfer shaft 132. The transfer shaft, in turn, rotatably powers the oil pump 134 and the coolant pump 104.

Although the present invention has been described in terms of a certain embodiment, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. An all terrain vehicle comprising a frame, a seat mounted to an upper portion of the frame, at least one front wheel and at least one rear wheel connected to the frame, an engine and an engine transmission assembly mounted within the frame, the engine comprising a cylinder block, a cylinder head assembly attached to the cylinder block and a crankcase cover attached to the cylinder block generally opposite the cylinder head assembly, a cooling pump attached to a side of at least one of the engine and the engine transmission assembly, a crankshaft mounted for rotation within a crankcase generally defined by the cylinder block and the crankcase cover, a balancer shaft positioned generally rearward of said crankshaft and driven by the crankshaft, and the cooling pump drive driven off the balancer shaft, wherein the cooling pump comprises a laterally extending external surface and the engine transmission assembly further comprises a laterally extending external surface arranged such that the laterally extending external surface of the cooling pump is closer to a longitudinal center plane of the vehicle than the laterally extending external surface of the engine transmission assembly.

2. The all terrain vehicle of claim 1, wherein the cooling pump is secured to the crankcase cover.

3. The all terrain vehicle of claim 2, wherein the cooling pump further comprises a substantially upwardly extending inlet port and a substantially downwardly extending outlet port.

4. The all terrain vehicle of claim 1 further comprising a radiating surface positioned forward of the engine, a conduit connecting the radiating surface and the cooling pump.

5. The all terrain vehicle of claim 4 further comprising a conduit connecting the radiating surface and a cooling passage in the cylinder head assembly.

6. The all terrain vehicle of claim 5 further comprising a conduit connecting a cooling passage in the cylinder block and the cooling pump.

7. The all terrain vehicle of claim 1 further comprising a foot rest, wherein the cooling pump is positioned forward of at least a portion of the foot rest.

8. The all terrain vehicle of claim 7, wherein the cooling pump is positioned forward of the entire foot rest.

9. The all terrain vehicle of claim 1, wherein the cooling pump drive is positioned vertically lower than the crankshaft.

10. The all terrain vehicle of claim 1, wherein the cooling pump drive is in line with and coupled to a cooling pump input shaft.

11. The all terrain vehicle of claim 1 further comprising an oil pump powered by the cooling pump drive.

12. An all terrain vehicle comprising a frame, an engine mounted to the frame, the engine comprising a cylinder block, a piston mounted for reciprocation within the cylinder block, a connecting rod connected to the piston, a crankshaft having at least one throw, the throw of the crankshaft connected to the connecting rod, the crankshaft positioned within a crankcase, one end of the crankshaft carrying a flywheel magneto, the other end of the crankshaft being connected to a clutch, a cooling pump and a lubricant pump positioned rearward of the crankshaft and the cooling pump and the lubricant pump being connected to the crankshaft through a gear train, the gear train being positioned completely between a first longitudinally extending plane extending through the connecting rod and a second longitudinally extending plane extending through the an inner surface of the flywheel magneto, and the cooling pump comprising a housing positioned to a side of the second longitudinally extending plane opposite of the first longitudinally extending plane.

13. The all terrain vehicle of claim 12 further comprising a crankcase cover member enveloping at least the flywheel magneto and a third longitudinally extending plane extending through an outermost portion of the crankcase cover member, wherein the housing is positioned entirely between the second longitudinally extending plane and the third longitudinally extending plane.

14. The all terrain vehicle of claim 12, wherein the cooling pump is located on one side of the cylinder block, and the transmission is located on the other side of the cylinder block and the lubricant pump is positioned between the cooling pump and the transmission.

15. An all terrain vehicle comprising a frame, a seat mounted to an upper portion of the frame, at least one front wheel and at least one rear wheel connected to the frame, an engine and an engine transmission assembly mounted within the frame, the engine comprising a cylinder block, a cylinder head assembly attached to the cylinder block and a crankcase cover attached to the cylinder block generally opposite the cylinder head assembly, a cooling pump attached to a side of at least one of the engine and the engine transmission assembly, a crankshaft mounted for rotation within a crankcase generally defined by the cylinder block and the crankcase cover, the engine transmission assembly comprising a continuously variable transmission having a first drive member and a second drive member driven by the first drive member, said continuously variable speed transmission driving a change speed transmission, said change speed transmission comprising a final transverse drive shaft that engages with a longitudinally extending output shaft of said change speed transmission, said cooling pump being disposed between said final transverse drive shaft and said crankshaft of said engine, a balancer shaft disposed rearward of said crankshaft and driven off the crankshaft and a cooling pump drive driven off the balancer shaft.

16. The all terrain vehicle of claim 15, wherein the balancer shaft is disposed between the first and second drive members.

17. The all terrain vehicle of claim 16 additionally comprising a belt member extending between the first and second drive members and defining a circumferentially extending perimeter, at least a portion of the cooling pump being disposed within the perimeter.

18. The all terrain vehicle of claim 15, wherein said continuously variable transmission comprises an input pulley secured to said first drive member and an output pulley secured to said second drive member and a flexible transmitter extending between said input pulley and said output pulley.

19. The all terrain vehicle of claim 18, wherein at least a portion of said cooling pump is disposed within a perimeter defined by said flexible transmitter.

20. The all terrain vehicle of claim 19, wherein said cooling pump is disposed on one lateral side of said engine and said continuously variable transmission is disposed on another lateral side of said engine.

21. The all terrain vehicle of claim 15, wherein said balancer shaft has a rotational axis, said cooling pump drive has a rotational axis and said balancer shaft rotational axis is disposed vertically higher than said cooling pump drive rotational axis.

22. The all terrain vehicle of claim 21, wherein said crankshaft has a rotational axis and said balancer shaft rotational axis is disposed vertically higher than said crankshaft rotational axis and said crankshaft rotational axis is disposed vertically higher than said cooling pump drive rotational axis.

23. The all terrain vehicle of claim 15, wherein said cooling pump drive also drives a lubricant pump.

24. The all terrain vehicle of claim 23, wherein said lubricant pump and said cooling pump are substantially axially aligned.

25. The all terrain vehicle of claim 15, wherein said balancer shaft is disposed within said crankcase.

26. The all terrain vehicle of claim 25, wherein said balancer shaft comprises a balancer portion that is disposed along a plane that extends through at least a portion of a connecting rod.

27. An all terrain vehicle comprising a frame, an engine mounted to the frame, the engine comprising a cylinder block, a piston mounted for reciprocation within the cylinder block, a connecting rod connected to the piston, a crankshaft having at least one throw, the throw of the crankshaft connected to the connecting rod, the crankshaft positioned within a crankcase, one end of the crankshaft carrying a flywheel magneto, the other end of the crankshaft being connected to a clutch, a cooling pump and a lubricant pump positioned rearward of the crankshaft and the cooling pump and the lubricant pump being connected to the crankshaft through a gear train, the cooling pump being located on one side of the cylinder block, the transmission being located on the other side of the cylinder block and the lubricant pump being positioned between the cooling pump and the transmission.

28. The all terrain vehicle of claim 27, wherein the gear train is positioned completely between a first longitudinally extending plane extending through the connecting rod and a second longitudinally extending plane extending through the an inner surface of the flywheel magneto.

29. The all terrain vehicle of claim 27 further comprising a crankcase cover member enveloping at least the flywheel magneto and a third longitudinally extending plane extending through an outermost portion of the crankcase cover member, wherein the housing is positioned entirely between the second longitudinally extending plane and the third longitudinally extending plane.

* * * * *

UNITED STATES PATENT AND TRADEMARK OFFICE
CERTIFICATE OF CORRECTION

PATENT NO. : 6,523,627 B2
DATED : February 25, 2003
INVENTOR(S) : Kazutaka Fukuda It is certified that error appears in the above-identified patent and that said Letters Patent is hereby corrected as shown below:

<u>Title page,</u>
Item [56], References Cited, U.S. PATENT DOCUMENTS, add:
-- 4,342,290    8/1982      Drakulic
4,535,866    8/1985      Shiga
4,667,758    5/1987      Tamura
4,687,069    8/1987      Inomata et al.
4,744,433    5/1988      Takeuchi et al.
4,828,017    5/1989      Watanabe et al.
5,159,901    11/1992     Chonan
5,636,608    6/1997      Shichinohe et al.
5,950,577    9/1999      Susaki et al.
5,957,230    9/1999      Harano
6,006,715    12/1999     Izumi et al. --

Signed and Sealed this

Twenty-ninth Day of July, 2003

JAMES E. ROGAN
*Director of the United States Patent and Trademark Office*